United States Patent
Sakurai et al.

(10) Patent No.: US 8,308,965 B2
(45) Date of Patent: Nov. 13, 2012

(54) STAMPER, METHOD OF MANUFACTURING THE STAMPER, AND MAGNETIC RECORDING MEDIUM MANUFACTURING METHOD USING THE STAMPER

(75) Inventors: Masatoshi Sakurai, Tokyo (JP); Satoshi Shirotori, Yokohama (JP); Seiji Morita, Tokyo (JP); Shinobu Sugimura, Yokohama (JP); Takuya Shimada, Kawasaki (JP); Yoshiyuki Kamata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 18 days.

(21) Appl. No.: 13/093,221

(22) Filed: Apr. 25, 2011

(65) Prior Publication Data

US 2012/0000885 A1    Jan. 5, 2012

(30) Foreign Application Priority Data

Jun. 30, 2010 (JP) ................. 2010-150459

(51) Int. Cl.
*B44C 1/22* (2006.01)
*C03C 15/00* (2006.01)
*C03C 25/68* (2006.01)
*C23F 1/00* (2006.01)

(52) U.S. Cl. .......................... 216/44; 425/385

(58) Field of Classification Search ............ 216/22, 216/44; 425/385
See application file for complete search history.

(56) References Cited

U.S. PATENT DOCUMENTS

| 2006/0057847 A1 | 3/2006 | Yanagawa et al. |
| 2010/0215788 A1 | 8/2010 | Kido |

FOREIGN PATENT DOCUMENTS

| JP | 63-298840 | 12/1988 |
| JP | 06-201908 | 7/1994 |
| JP | H08-096426 | 4/1996 |
| JP | 10-308040 | 11/1998 |
| JP | 2004-110882 | 4/2004 |
| JP | 2005-203077 | 7/2005 |
| JP | 2010-225260 | 10/2010 |
| WO | WO 2004/101248 | 11/2004 |

OTHER PUBLICATIONS

Office Action dated Sep. 13, 2011 for JP 2010-150459 in 7 pages.

*Primary Examiner* — Roberts Culbert
(74) *Attorney, Agent, or Firm* — Knobbe, Martens, Olson & Bear LLP

(57) ABSTRACT

According to one embodiment, a stamper manufacturing method includes forming a conductive material concentration gradient layer including the projections pattern, and a composition ratio of a buffering agent to a conductive material in the conductive material concentration gradient layer reducing in a thickness direction from a master side.

7 Claims, 6 Drawing Sheets

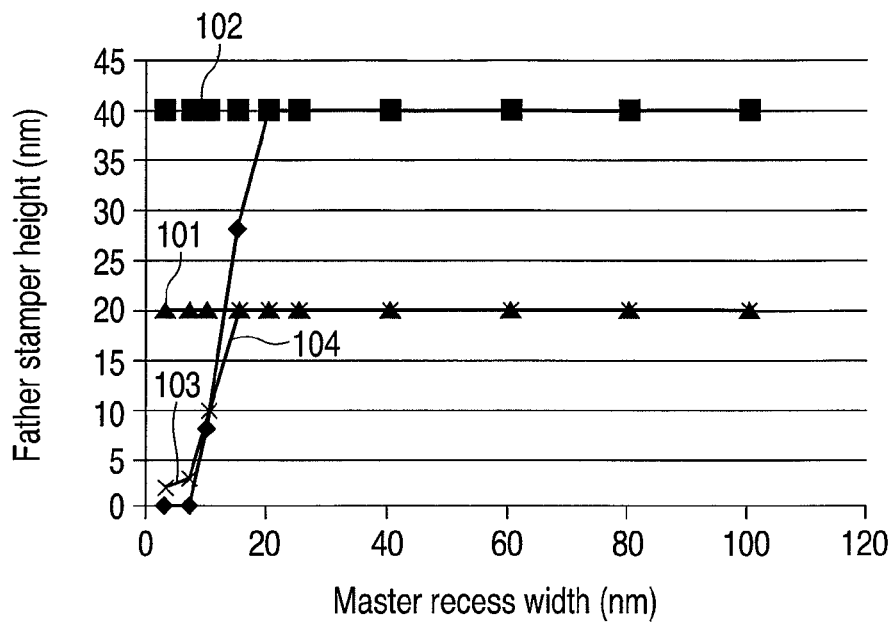
F I G. 6
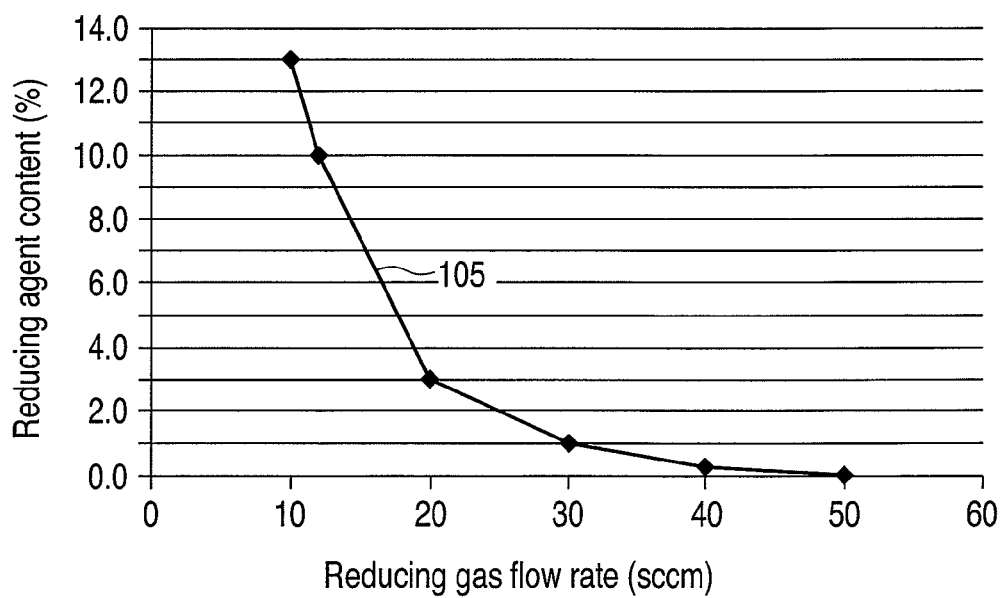
F I G. 7

STAMPER, METHOD OF MANUFACTURING THE STAMPER, AND MAGNETIC RECORDING MEDIUM MANUFACTURING METHOD USING THE STAMPER

CROSS-REFERENCE TO RELATED APPLICATIONS

This application is based upon and claims the benefit of priority from Japanese Patent Application No. 2010-150459, filed Jun. 30, 2010; the entire contents of which are incorporated herein by reference.

FIELD

Embodiments described herein relate generally to a stamper to be used to duplicate a resin stamper for transferring a discrete track shape or bit pattern shape onto the surface of a magnetic recording layer, a method manufacturing the stamper, and a magnetic recording medium manufacturing method using the stamper.

BACKGROUND

As the track density of an HDD increases in recent years, the problem of interference with an adjacent track is becoming serious. In particular, reducing side write due to the recording head magnetic field fringe effect is an important technical subject. A discrete track pattern medium (DTR medium) in which recording tracks are physically separated can reduce the side erase phenomenon that occurs during recording and the side read phenomenon by which information of an adjacent track mixes in during reproduction, thereby increasing the density is the cross track direction. This makes the DTR medium promising as a high-density magnetic recording medium. In addition, a bit patterned medium (BPM) physically divided in the bit direction as well has been proposed as a high-density magnetic recording medium capable of suppressing the medium noise and the thermal decay phenomenon by which recorded data disappears at room temperature.

Since the DTR medium and BPM are manufactured using the etching processing technique, the manufacturing cost may increase. Therefore, the following method has been proposed. That is, fine patterns obtained by EB (Electron Beam) lithography are transferred to a master, and a mother stamper (or a master stamper) such as a Ni stamper is duplicated from the master by electroforming. The mother stamper is then set in an injection molding machine, and resin stampers are mass-produced by injection molding. The DTR medium or BPM manufactured by UV (UltraViolet-curing) imprinting using the resin stamper.

When manufacturing the DTR medium or BPM, it is necessary to transfer fine patterns whose size is 1/10 or less that of patterns formed on optical disks. When patterns are downsized as the recording density increases, however, it often becomes difficult to duplicate the mother stamper from the master by electroforming.

For example, when a conductive film for performing electroforming is deposited by sputtering, the openings of fine patterns are closed to form cavities because the deposition rate of pattern projections is higher than that pattern recesses. Since no electroformed film is formed in master recesses, pattern transfer defects sometimes occur. When performing deposition by a chemical vapor growth method, such as a transfer method capable of depositing layers even on the sidewalls by using CVD or ALD, a conductive layer can be deposited even in pattern recesses without forming cavities. However, in a deposition method using a chemical reaction in a vapor phase, a master (or Ni stamper) and conductive layer come in tight contact with each other. This sometimes makes it impossible to clearly release patterns.

As described above, as patterns are downsized, conductive film deposition defects occur in pattern recesses when using a physical vapor growth method such as sputtering, and release defects occur when using a chemical vapor growth method such as CVD or ALD. This makes it difficult to simultaneously achieve the conductivity, releasability, and pattern reproducibility when duplicating fine patterns.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 6 is a graph showing the relationship between the projections height and master groove width in an embodiment; and FIG. 7 is a graph showing the relationship between the reducing gas flow rate and the content of a buffering material in an embodiment.

DETAILED DESCRIPTION

Figure 1A:
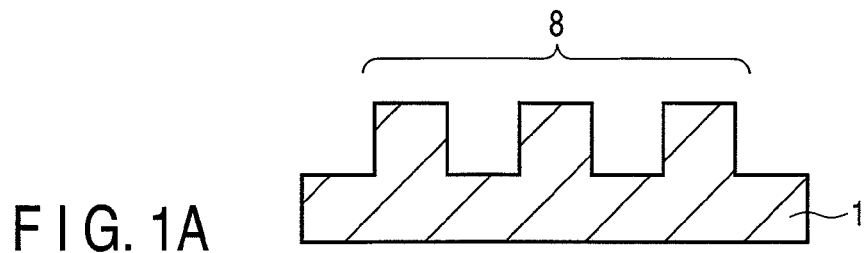
FIG. 1A is an example view of a stamper manufacturing process according to an embodiment.

Various embodiments will be described hereinafter with reference to the accompanying drawings.

In general, according to one embodiment, a stamper according to an embodiment is a stamper including a projections pattern for forming, on a magnetic recording layer of a magnetic recording medium, recording tracks or recording bits and positioning information of a read/write head, the stamper including a stamper main body including the projections pattern on one major surface, and a conductive layer formed along the one major surface.

The conductive layer is a conductive material gradient layer which contains a conductive material and buffering material, and includes the projections pattern, and in which the concentration of the buffering material with respect to the conductive material increases from the stamper main body surface toward the other surface.

Also, a stamper manufacturing method according to an embodiment includes the processes of forming a conductive layer on a master including a projections pattern for forming, on a magnetic recording layer, recording tracks or recording bits and positioning information of a read/write head, forming a stamper main body including the projections pattern by performing electroforming by using the conductive layer as an electrode, and releasing, from the master, a stamper including the conductive layer and stamper main body and including the projections pattern. As the conductive layer, a conductive layer which includes the projections pattern, and in which the composition ratio of a buffering agent to a conductive material reduces in the thickness direction from the master side, is formed by using a chemical vapor growth method.

Furthermore, a magnetic recording medium manufacturing method according to an embodiment forms, on a master including a projections pattern for forming, on a magnetic recording layer, recording tracks and recording bits and positioning information of a read/write head, a conductive layer which includes the projections pattern, and in which the composition ratio of a buffering agent to a conductive material reduces in the thickness direction from the master side, by using a chemical vapor growth method, forms a stamper main body including the three-dimensional pattern by performing electroforming by using the conductive layer as an electrode, and obtains a stamper by releasing, from the master, a stamper including the conductive layer and stamper main body and including the projections pattern.

Then, a resin stamper including the projections pattern is duplicated by using the obtained stamper.

After that, the magnetic recording layer surface of the magnetic recording medium and the projections pattern surface of the resin stamper are adhered by using a coating layer of an uncured pattern transfer ultraviolet-curing resin material.

The coating layer of the uncured ultraviolet-curing resin material is cured by irradiation with ultraviolet light.

The projections pattern is transferred onto one surface of the magnetic recording medium by releasing the resin stamper, and an ultraviolet-curing resin material layer is formed by curing the projections pattern.

Dry etching is performed by using the cured ultraviolet-curing resin material layer as a mask, thereby forming the projections pattern on the magnetic recording layer surface.

The buffering material may contain at least one element selected from the group consisting of fluorine, chlorine, bromine, iodine, oxygen, nitrogen, hydrogen, sulfur, and carbon.

The conductive material is selected from the group consisting of nickel, titanium, cobalt, and copper.

The conductive material concentration gradient layer has a thickness of 0.5 to 10 nm.

The chemical vapor growth method includes alternately supplying a reaction gas containing the conductive material and a reducing gas containing the buffering agent, and the conductive material concentration gradient layer is formed by changing at least one of the flow rate of the reducing gas and the temperature of vapor growth.

The buffering agent herein used is an additive component to be added, together with the conductive material, to the conductive material concentration gradient layer, in order to improve the releasability of the conductive layer with respect to the master.

Embodiments will be explained below with reference to the accompanying drawings.

FIGS. 1A, 1B, 1C, and 1D are views showing examples of stamper manufacturing processes according to an embodiment, i.e., showing processes of forming a father stamper from a master.

Stamper Manufacturing Method (Manufacture of Master)

First, a master 1 having a projections pattern as shown in FIG. 1A was manufactured. For example, an Si substrate is prepared as a substrate of the master 1. Resist ZEP-520A available from ZEON is diluted to twice the volume with anisole, and the solution is filtered through a 0.05-μm filter. The substrate is spin-coated with the resist solution and prebaked at 200° C. for 3 min, thereby forming a resist layer about 30 nm thick. After that, the resist layer is removed from the edge portion serving as an electrode in electroforming. Subsequently, an electron beam lithography apparatus having a ZrO/W thermal field emission type electron gun emitter is used to directly write desired patterns on the resist on the substrate at an acceleration voltage of 50 kV.

Figure 2:
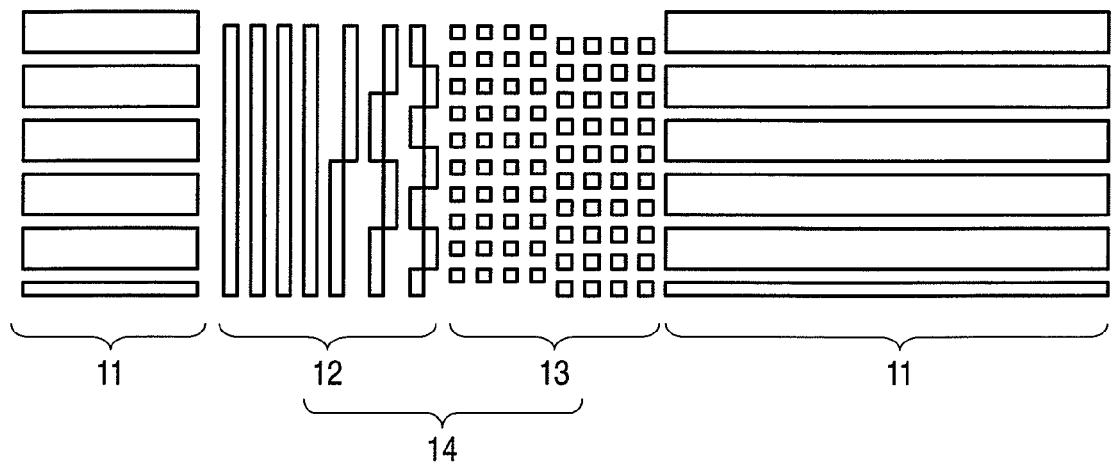
FIG. 2 is an example view of patterns of a discrete track type magnetic recording medium according to an embodiment.

FIG. 2 shows a servo pattern, burst pattern, address pattern, and track pattern of a discrete track type magnetic recording medium.

Figure 3:
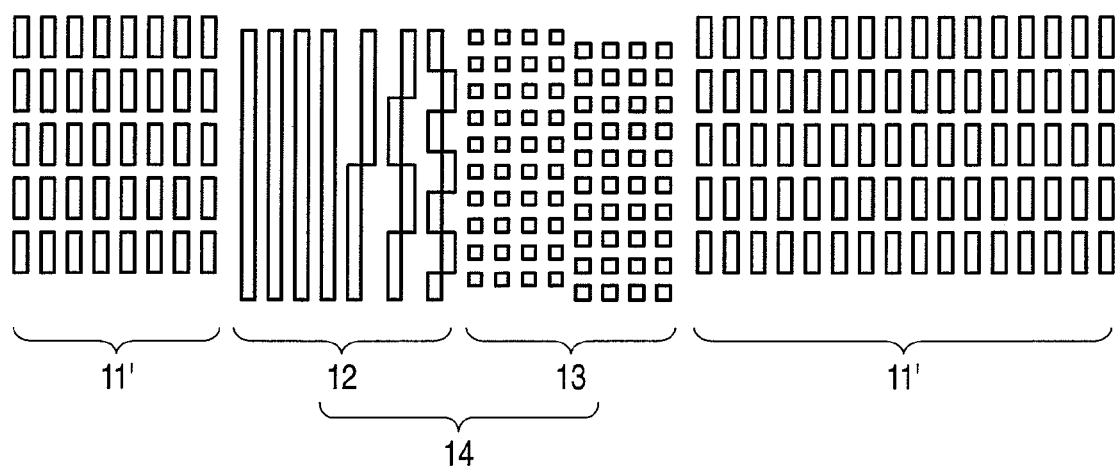
FIG. 3 is an example view of patterns of a bit patterned medium type magnetic recording medium according to an embodiment.

FIG. 3 shows a servo pattern, burst pattern, address pattern, and bit pattern of a bit patterned medium type magnetic recording medium.

This lithography is performed using a signal source that synchronously generates a signal for forming a servo pattern, burst pattern, address pattern, and track pattern (or bit pattern) as shown in, e.g., FIGS. 2 and 3, a signal to be supplied to a stage driving system (a so-called X-θ stage driving system including a rotating mechanism and a moving mechanism having a moving axis in at least one direction) of the lithography apparatus, and an electron beam deflection control signal. During the lithography, the stage is rotated at a CLV (Constant Linear Velocity) of 500 mm/s, and moved in the radial direction as well. Also, concentric track areas are written by deflecting the electron beam for every rotation. Note that the feeding speed is 7.8 nm per rotation, and one track (equivalent to one address bit width) is formed by ten rotations. Subsequently, the resist is developed by dipping the substrate in developer ZED-N50 (available from ZEON) for 90 sec. After that, the substrate is rinsed as it is dipped in ZMD-B (available from ZEON) for 90 sec, and dried by air blow, thereby performing resist patterning.

Thus, the master having projections patterns containing recording tracks or recording bits and information (a preamble, address, and burst) for positioning a read/write head is obtained. The master can also be obtained by forming projections patterns on a Si substrate by etching based on the above-mentioned resist patterns.

Formation of Conductive Material Concentration Gradient Layer

Figure 1B:
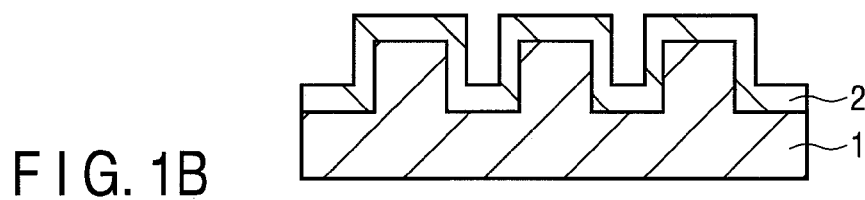
FIG. 1B is an example view of a stamper manufacturing process according to the embodiment.

After that, as shown in FIG. 1B, a conductive material concentration gradient layer 2 for performing electroforming on the side of a projections pattern surface 8 of the master 1 is formed. The conductive material concentration gradient layer 2 is a layer formed by adding a tradiently distributed buffering material to a metal. The larger the content of the buffering material, the higher the releasability from the master 1, but the lower the conductivity. Therefore, it is possible to simultaneously increase the releasability from the master and the conductivity for electroforming by reducing the buffering material on the electroformed layer side by distributing a large amount of the buffering agent on the master side. A stamper having a high pattern reproducibility in stamper duplication can be obtained by using this conductive material concentration gradient layer having a high releasability from the master and a high conductivity. The conductive material concentration gradient layer can be formed by using a chemical vapor growth method such as ALD or CVD. When using the chemical vapor growth method, it is possible to obtain a film having a high coverage on the bottom and sidewall portions of fine patterns. It is also possible to control the content of the buffering material on an atomic layer level.

The film thickness can be 0.5 to 10 nm. If the film thickness is less than nm, no uniform film can be obtained, so the film resistance rises, and this often makes it impossible to obtain a high conductivity. If the film thickness exceeds 10 nm, patterns having a groove width of 20 nm or less are filled with the conductive material concentration gradient layer, and the surface area reduces. Since this decreases the adhesion with the electroformed layer, a release defect tends to occur. Also, if the film thickness increases, recesses start being closed, and cavities readily form in portions where the edge roughness of the projections patterns is large. Furthermore, when depositing a film having a thickness exceeding 10 nm by using ALD, the efficiency decreases in respect of both tact and cost.

The content of the buffering material can be set at 2 to 10 at % on the master side, and 0 (no buffering material) to 1 at % on the electroformed layer side. If the content is less than 2 at % on the master side, the releasability decreases. If the content exceeds 10 at % on the master side, corrosion of the metal film or deterioration of the crystallinity often increases the roughness. If the content exceeds 1 at % on the electroformed layer side, the adhesion to the electroformed layer decreases, or the conductivity decreases due to the rise in resistance. This often causes an electroforming defect. Examples of the metal usable as the conductive material are Ni, Ti, Ta, Co, Cu, Ru, Pt, Pd, Hf, and Ir, but the metal is not particularly limited. When Ni as the same material as that of electroforming is used as the metal, pattern deformation caused by the film stress tends to reduce.

As the buffering material, it is possible to use at least one of a halogen such as F, Cl, Br, or I, oxygen, nitrogen, hydrogen, sulfur, and carbon to be used as a source gas of chemical vapor growth. Normally, a halogen gas is not used as a conductive layer because the gas causes corrosion. However, the effect of release improved when selecting a halogen gas from the viewpoint of ionicity. TiN, Co, or Cu can be selected as the above-mentioned metal because each of these metals contains a halogen in a source gas, and this facilitates halogen mixing. The content of the buffering material is controlled by controlling the substrate temperature by a thermal reaction, and controlling the reducing gas flow rate by a radical reaction.

When using Ni as the conductive material concentration gradient layer, it is possible to use, e.g., $Ni(acetylacetonato)_2$ as the source gas, and $H_2$ as the reducing gas. A 5-nm thick Ni layer can be deposited by fixing the substrate temperature at 250° C., and repeating an atomic layer deposition cycle twenty times while $N_2$ keeps flowing in order to supply and exhaust the gases. The atomic layer deposition cycle includes an $Ni(acetylacetonato)_2$ adsorption time of 3 sec, an $Ni(acetylacetonato)_2$ exhaust time of 3 sec, an $H_2$ reducing gas supply time of 20 sec, and an exhaust time of 3 sec for a by-product formed by $H_2$ and reduction. By gradually increasing the reducing gas flow rate from 20 to 50 sccm, it is possible to obtain an electroformable film (conductive material concentration gradient layer) readily releasable on the master side, in which the chlorine content is 3 at % on the master side and 0.1 at % on the electroformed layer side. Also, by fixing the reducing gas flow rate at 50 sccm and gradually increasing the substrate temperature from 150° C. to 300° C., it is similarly possible to obtain a conductive material concentration gradient layer in which the chlorine content is 3 at % on the master side and 0.1 at % on the electroformed layer side. Furthermore, $Ni(N,N'-diisopropyl-acetamidinato)_2$ can also be used as the source gas.

When using TiN as the conductive material concentration gradient layer, it is possible to use, e.g., $TiCl_4$ as the source gas, and $NH_3$ as the reducing gas. A 5-nm thick TiN layer can be deposited by fixing the substrate temperature at 300° C., and repeating an atomic layer deposition cycle twenty times while $N_2$ keeps flowing in order to supply and exhaust the gases. The atomic layer deposition cycle includes a $TiCl_4$ adsorption time of 2 sec, a $TiCl_4$ exhaust time of 2 sec, an $NH_3$ reducing gas supply time of 10 sec, and an exhaust time of 2 sec for a by-product formed by $NH_3$ and reduction. By gradually increasing the reducing gas flow rate from 50 to 100 sccm, it is possible to obtain an electroformable film (conductive material concentration gradient layer) readily releasable on the master side, in which the chlorine content is 3 at % on the master side and 0.1 at % on the electroformed layer side. $TiI_4$ can also be used as the source gas.

When using Cu as the conductive material concentration gradient layer, it is possible to use, e.g., CuCl as the source gas, and $H_2$ as the reducing gas. A 5-nm thick Cu layer can be deposited by fixing the substrate temperature at 200° C., and repeating an atomic layer deposition cycle twenty times while $N_2$ keeps flowing in order to supply and exhaust the gases. The atomic layer deposition cycle includes a CuCl adsorption time of 3 sec, a CuCl exhaust time of 3 sec, an $H_2$ reducing gas supply time of 20 sec, and an exhaust time of 3 sec for a by-product formed by $H_2$ and reduction. By gradually increasing the reducing gas flow rate from 20 to 50 sccm, it is possible to obtain an electroformable film (conductive material concentration gradient layer) readily releasable on the master side, in which the chlorine content is 3 at % on the master side and 0.1 at % on the electroformed layer side. It is also possible to use $Cu(acetylacetonato)_2$ or $Cu(2,2,6,6-tetramethyl-3,5-heptanedionato)_2$ as the source gas.

When using Co as the conductive material concentration gradient layer, it is possible to use, e.g., $Co(N,N'-diisopropyl-acetamidinato)_2$ as the source gas, and $H_2$ as the reducing gas. A 5-nm thick Co layer can be deposited by fixing the substrate temperature at 250° C., and repeating an atomic layer deposition cycle twenty times while $N_2$ keeps flowing in order to supply and exhaust the gases. The atomic layer deposition cycle includes a Co(N,N'-diisopropyl-acetamidinato)$_2$ adsorption time of 3 sec, a Co(N,N'-diisopropyl-acetamidinato)$_2$ exhaust time of 3 sec, an H$_2$ reducing gas supply time of 20 sec, and an exhaust time of 3 sec for a by-product formed by H$_2$ and reduction. By gradually increasing the reducing gas flow rate from 50 to 100 sccm, it is possible to obtain an electroformable film (conductive material concentration gradient layer) readily releasable on the master side, in which the chlorine content is 3 at % on the master side and 0.1 at % on the electroformed layer side.

As described above, the content of the buffering material can be controlled by controlling the substrate temperature and reducing gas flow rate. However, the source gas and reducing gas are not limited to the above-mentioned gases as long as chemical vapor growth is possible.

Electroforming Process

Figure 1C:
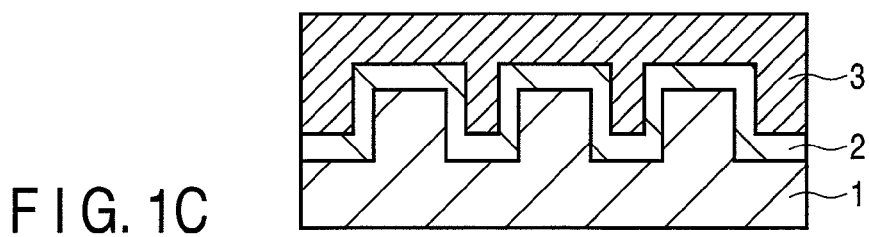
FIG. 1C is an example view of a stamper manufacturing process according to the embodiment.

As shown in FIG. 1C, electrical conduction was obtained by using a conductive ring on the outer periphery the master 1 including the conductive material concentration gradient layer 2, and Ni electroforming was performed for 90 min by dipping the master 1 in a nickel sulfamate plating solution, thereby forming an electroformed film 3 about 300 μm thick. The electroforming bath conditions are as follows.

Figure 1D:
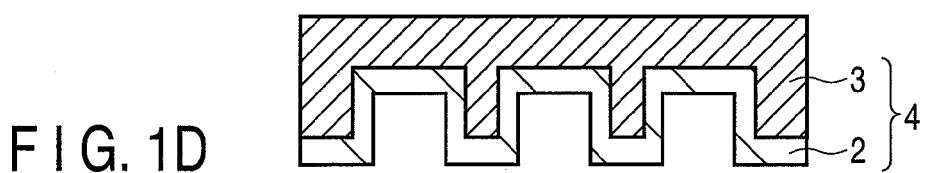
FIG. 1D is an example view of a stamper manufacturing process according to the embodiment.

Nickel sulfamate: 600 g/L (NS-160 available from Showa Chemical Industry)
Boric acid: 40 g/L
Surfactant (sodium lauryl sulfate) 0.15 g/L
Solution temperature: 55° C.
pH: 4.0
Current density: 20 A/dm$^2$ Subsequently, as shown in FIG. 1D, a stamper 4 including the conductive material concentration gradient layer 2 and electroformed layer 3 was released from the master 1.

The stamper 4 manufactured as described above will be called a father stamper hereinafter.

Release Process

The master 1 and father stamper can be separated from the side of the conductive material concentration gradient layer in which a large amount of the buffering agent is distributed. Thus, the stamper 4 of the embodiment having a feature that a large amount of the buffering material is contained on the outermost surface side is obtained.

After that, the Ni stamper surface may be oxidized (not shown) by performing passivation by oxygen RIE (Reactive Ion Etching). This surface oxidation improves the releasability in stamper duplication. More specifically, oxygen RIE is performed for 3 min by applying a power of 100 W in a chamber in which the pressure is adjusted to 4 Pa by supplying oxygen gas at 100 sccm.

Stamper Duplication Method

FIGS. 4A, 4B, 4C, and 4D are views showing examples of stamper manufacturing processes according to an embodiment, i.e., showing processes of forming a mother stamper from the father stamper.

Figure 4A:
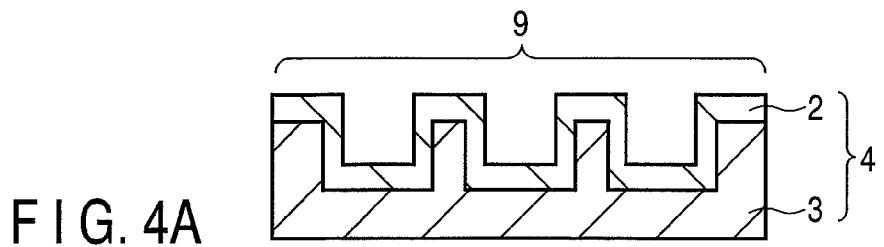
FIG. 4A is an example view of a stamper manufacturing process according to an embodiment.
Figure 4B:
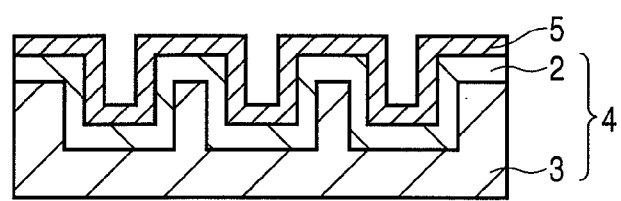
FIG. 4B is an example view of a stamper manufacturing process according to the embodiment.

As shown in FIGS. 4A and 4B, a conductive material concentration gradient layer 5 described above is formed on the side of a stamper projections pattern surface 9 of the father stamper 4.

Figure 4C:
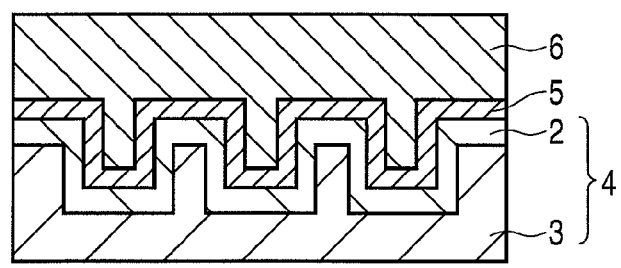
FIG. 4C is an example view of a stamper manufacturing process according to the embodiment.

Then, as shown in FIG. 4C, electrical conduction is obtained on the lower surface of the father stamper, and Ni electroforming is performed by dipping the father stamper in a nickel sulfamate plating solution, thereby forming an electroformed layer 6 about 300 μm thick.

Figure 4D:
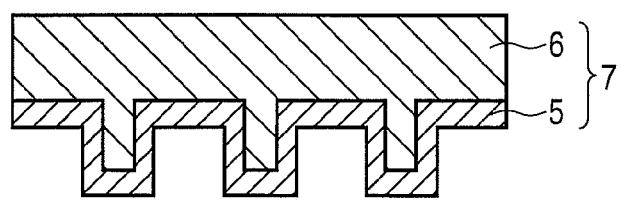
FIG. 4D is an example view of a stamper manufacturing process according to the embodiment.

Subsequently, as shown in FIG. 4D, a stamper 7 including the electroformed layer 6 and conductive material concentration gradient layer 5 is released from the father stamper 4. The stamper 7 duplicated from the father stamper will be called a mother stamper hereinafter. The father stamper and mother stamper can be separated from the conductive material concentration gradient layer containing a large amount of the buffering material. Thus, according to the feature of the stamper of the embodiment, a large amount of the buffering material contained on the outermost surface side is obtained. The conductive material concentration gradient layer used in the mother stamper can also be made of a material different from that of the conductive material concentration gradient layer used in the father stamper. For example, when using Ni as the conductive material concentration gradient layer of the father stamper and TiN as that of the mother stamper, the releasability improves because the crystallinity of the interface between the father stamper and mother stamper can be changed.

It is also possible to repeat duplication from the mother stamper to a son stamper and from the son stamper to a daughter stamper, but duplication generations are not particularly limited.

Magnetic Recording Medium Manufacturing Method

A method of manufacturing a DTR medium or BPM will be explained below with reference to FIGS. 5A, 5B, 5C, 5D, 5E, 5F, 5G, 5H, and 5I.

First, the Ni stamper manufactured by the method explained with reference to FIGS. 1A, 1B, 1C, and 1D and FIGS. 4A, 4B, 4C, and 4D is set in an injection molding apparatus (SD40E manufactured by Sumitomo Heavy Industries), and a resin stamper is manufactured. Although the molding material is cyclic olefin polymer ZEONOR 1060R available from ZEON, polycarbonate material AD5503 available from TEIJIN CHEMICALS can also be used.

Figure 5A:
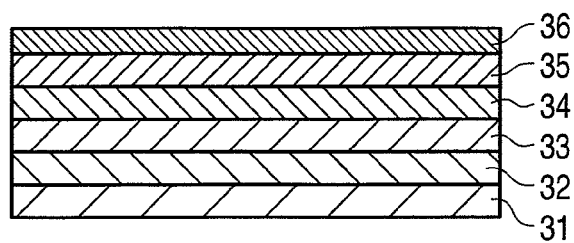
FIG. 5A is an example view of a magnetic recording medium manufacturing process according to an embodiment.

After that, as shown in FIG. 5A, a 120-nm thick soft magnetic layer 32 (CoZrNb), 20-nm thick orientation controlling underlayer 33 (Ru), 15-nm thick ferromagnetic recording layer 34 (CoCrPt—SiO$_2$), and 15-nm thick protective layer 35 (C) are sequentially deposited on a glass substrate 31. A metal layer 36 (3 to 5 nm) is deposited on the protective layer 35. This metal is a material having a high adhesion to a UV resist (to be described later), and completely removable by etching using He+N$_2$ gas in a process shown in FIG. 5G. Practical examples are CoPt, Cu, Al, NiTa, Ta, Ti, Si, Cr, NiNb, and ZrTi. Of these materials, CoPt, Cu, and Si are particularly superior in balance between the UV resist adhesion and the releasability by He+N$_2$ gas.

A 50-nm thick UV resist 37 is formed by spin coating on the metal layer 36. The UV resist is an ultraviolet-curing material made of, e.g., a monomer, oligomer, and polymerization initiator. An example is a material containing isobornyl acrylate (IBOA) as a monomer, polyurethane diacrylate (PUDA) as an oligomer, and IRGACURE369 as a polymerization initiator, such that the contents of IBOA, PUDA, and IRGACURE369 are respectively 85, 14.5, and 0.5 wt %.

Figure 5B:
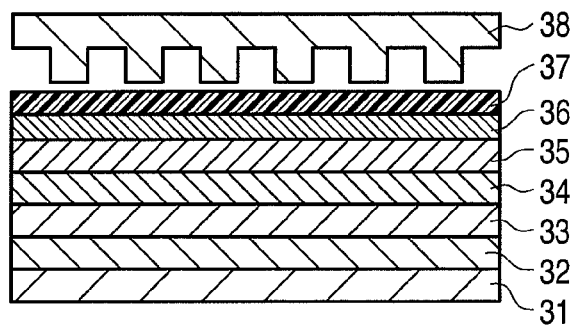
FIG. 5B is an example view of a magnetic recording medium manufacturing process according to the embodiment.
Figure 5C:
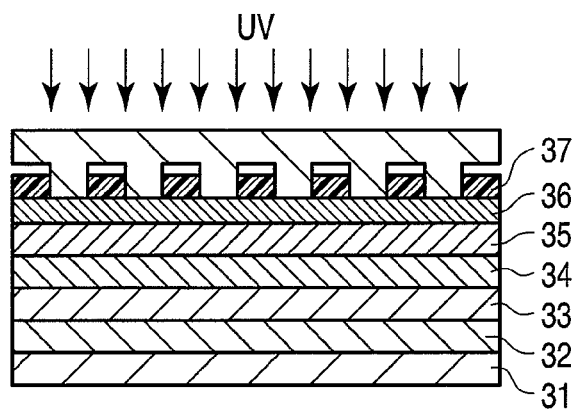
FIG. 5C is an example view of a magnetic recording medium manufacturing process according to the embodiment.

After that, UV imprinting is performed using a resin stamper 38 as shown in FIGS. 5B and 5C.

Figure 5D:
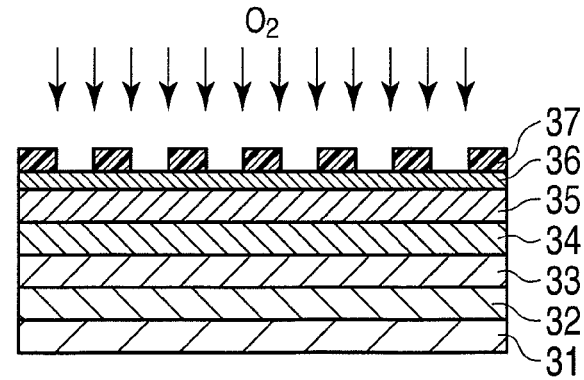
FIG. 5D is an example view of a magnetic recording medium manufacturing process according to the embodiment.

Subsequently, as shown in FIG. 5D, oxygen gas is used to remove the imprint residue by using an ICP etching apparatus. For example, the residue formed by the imprint process is removed by using oxygen as a process gas at a chamber pressure of 2 mTorr, a coil RF of 100 W, and a platen RF of 100 W for an etching time of 30 sec.

Figure 5E:
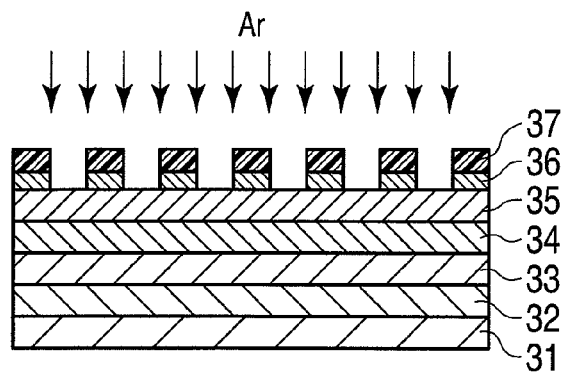
FIG. 5E is an example view of a magnetic recording medium manufacturing process according to the embodiment.

As shown in FIG. 5E, the metal layer 36 is then etched by ion beam etching using Ar gas. This process is not always necessary and may be omitted because, example, the metal layer 36 can also be etched by increasing the anisotropy (e.g., increasing the platen RF of the ICP conditions to about 300

W) in the imprint residue removing process (FIG. 5D). When using Si as the metal layer, $CF_4$ gas can also be used.

Figure 5F:
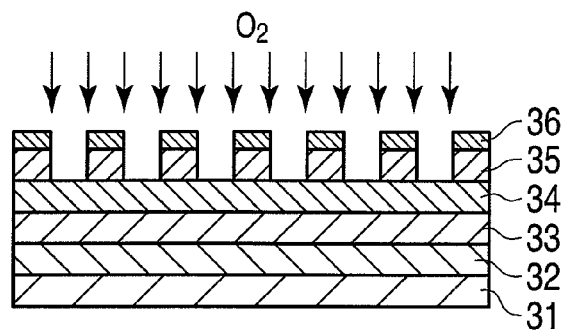
FIG. 5F is an example view of a magnetic recording medium manufacturing process according to the embodiment.

After that, as shown in FIG. 5F, the C protective layer 35 is etched through the metal layer 36 as a mask by the ICP etching apparatus by using oxygen gas. A C mask 35 is formed by using oxygen as a process gas at a chamber pressure of 2 mTorr, a coil RF of 100 W, and a platen RF of 100 W for an etching time of 30 sec.

Figure 5G:
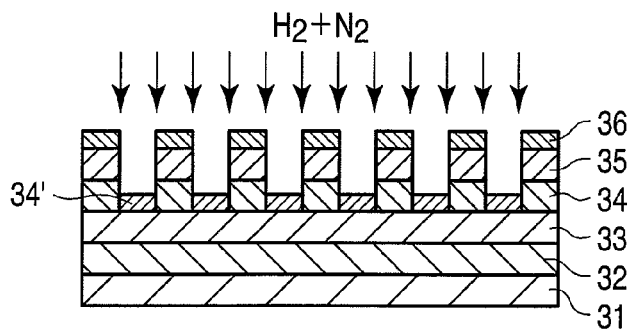
FIG. 5G is an example view of a magnetic recording medium manufacturing process according to the embodiment.

As shown in FIG. 5G, ion beam etching is performed on a portion of the ferromagnetic recording layer 34 through the formed C mask by using He or He+$N_2$ (mixing ratio=1:1). ECR can be used in the ionization of the gas. For example, etching is performed at a microwave power of 800 W and an acceleration voltage of 1,000V for 20 sec, thereby forming a 10-nm thick projections pattern that partially divides the ferromagnetic recording layer. A 5-nm thick residue 34' of the ferromagnetic recording layer deactivates the magnetism due to the effect of the exposure to He+$N_2$. In this process, it is important to completely remove the metal layer 36 (e.g., Cu) deposited in the process shown in FIG. 4A at the same time. This is so because if the metal layer remains, the C mask 35 protected by the metal layer 36 cannot be removed in the next C mask removing process performed by RIE using oxygen gas.

Figure 5H:
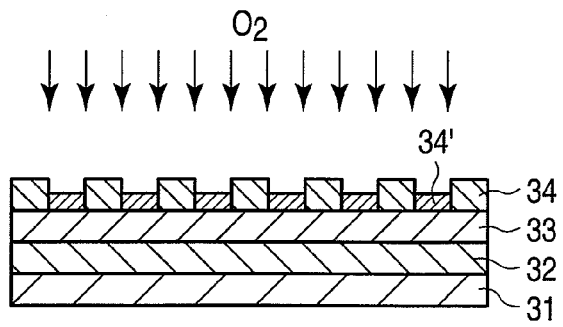
FIG. 5H is an example view of a magnetic recording medium manufacturing process according to the embodiment.

After that, as shown in FIG. 5H, the C mask 35 is removed by RIE using oxygen gas at 100 mTorr and 100 W for an etching time of 30 sec.

Figure 5I:
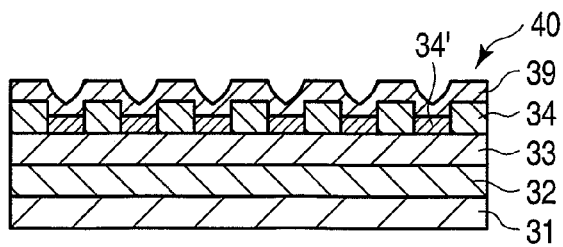
FIG. 5I is an example view of a magnetic recording medium manufacturing process according to the embodiment.

Finally, as shown in FIG. 5I, a 4-nm thick surface C protective film is formed on the ferromagnetic recording layers 34 and 34' by CVD and coated with a lubricant, thereby obtaining a DTR medium or BPM.

When depositing Ni as a conductive layer by sputtering for comparison, openings of fine patterns are closed to form cavities because the deposition rate of pattern projections is higher than that of pattern recesses. Since no electroformed layer is formed in master recesses, pattern transfer defects occur. After that, Ni electroforming is performed for 90 min by dipping the master in a nickel sulfamate plating solution, thereby forming an electroformed layer about 300 μm thick. Subsequently, the electroformed layer is released from the master. Consequently, the patterns collapse during the release because the adhesion between the master and Ni conductive film is strong.

Also, when forming a release layer in order to prevent pattern collapse a stamper having a pattern width different from that of the master is duplicated.

In the stamper manufacturing method for comparison, the conductive layer is a Ni single layer, and a physical vapor growth method such as sputtering is used. In the process of this method, cavities form in grooves having a width of 20 nm or less, and electroformed pattern formation defects occur. By contrast, in the stamper manufacturing method according to the embodiment, the conductive layer is a metal layer (conductive material concentration gradient layer) containing a gradiently distributed buffering material, and a chemical vapor growth method such as ALD or CVD is used. This makes it possible to provide a stamper having no cavities and releasable from the master.

In addition, in the conventional stamper manufacturing method, the release layer is formed on the master side, so a stamper having a pattern width different by the thickness of the release layer from that of the master is duplicated. In the stamper of the embodiment, the conductive layer is given releasability, so no release layer need be formed on the master side. Since the conductive layer comes in tight contact with the duplicated stamper side, the master pattern width can accurately be duplicated.

EXAMPLES

Example 1

A stamper was manufactured by the method shown in FIGS. 1A, 1B, 1C, and 1D. A master having a groove width of 20 nm was used, the substrate temperature was fixed at 250° C., Ni(acetylacetonato)$_2$ was used as a source gas, $H_2$ was used as a reducing gas, and a conductive material concentration gradient layer in which the metal of the conductive material concentration gradient layer was Ni and that of a buffering material was C was used. Deposition was performed by changing the film thickness of the conductive material concentration gradient layer from 0.3 to 12.0 nm. When the content of the buffering material of the manufactured stamper was measured by SIMS, the carbon content in the film was 3 at % on the master side and 0.1 at % on the electroformed layer side. When the film thickness of the conductive material concentration gradient layer was 0.5 nm (inclusive) to 13 nm (inclusive), electroforming was possible, and the releasability was high. When the film thickness of the conductive material concentration gradient layer was smaller than 0.5 nm, electroforming defects occurred. When the film thickness of the conductive material concentration gradient layer was larger than 10 nm, the electroformed layer partially peeled off. In a portion where the film thickness of the conductive material concentration gradient layer was larger than 10 nm with respect to an opening having a groove width of 20 nm, recesses started being filled. Therefore, the electroformed layer peeled off probably because the adhesion reduced due to the reduction in surface area, and the film density decreased due to the generation of micro cavities in portions where the sidewall roughness was large.

TABLE 1

|  | 0.3 | 0.5 | 1.0 | 3.0 | 5.0 | 8.0 | 10.0 | 11.0 | 12.0 |
|---|---|---|---|---|---|---|---|---|---|
| Conductivity | x | o | o | o | o | o | o | o | o |
| Releasability | — | o | o | o | o | o | o | x | x |

Comparative Example 1

Stampers were manufactured following the same procedures as in Example 1 except that the content of a buffering material was not gradiently distributed but set at 0.1 and 3 at %. The film thickness of a conductive material concentration gradient layer was fixed to 3 nm. A stamper in which the content of the buffering material was 0.1 at % could not be released from the master, and pattern peeling occurred. On the other hand, in a stamper in which the content of the buffering material was 3 at %, film peeling occurred during electroforming regardless of the film thickness, so no electroformed film could be formed.

TABLE 2

|  | Example 1 (gradient distribution) | Comparative Example 1 (no gradient distribution 0.1%) | Comparative Example 1 (no gradient distribution 3.0%) |
|---|---|---|---|
| Conductivity | o | o | x |
| Releasability | o | x | — |

Example 2

Stampers were manufactured by changing the material of a conductive material concentration gradient layer to TiN (a source gas was $TiCl_4$ and a reducing gas was $NH_3$), Co (a source gas was $Co(N,N'$-diisopropyl-acetamidinato$)_2$ and a reducing gas was $H_2$), and Cu (a source gas was CuCl and a reducing gas was $H_2$). Chlorine (Cl) or carbon (C) was used as a buffering material, and the film thickness of the conductive material concentration gradient layer was 5 nm. When the contents of the buffering material of the manufactured stampers were measured by SIMS, the chlorine content in the film was 3 at % on the master side and 0.1 at % on the electroformed layer side in each stamper. The film resistance of the master on which the conductive material concentration gradient layer was deposited was measured by a four-point probe method, and the resistivity was calculated by using the film thickness of the conductive layer and a correction coefficient RCF (Resistivity Correction Factor). Consequently, the resistivity was equivalent to that of Ni, i.e., conductivity sufficient to perform electroforming was obtained. Also, it is well possible to release the stampers.

TABLE 3

| | Conductive gradient layer | | | |
|---|---|---|---|---|
| | Ni—C | TiN—Cl | Co—C | Cu—Cl |
| Resistivity (Ωcm) | $1 \times 10^{-4}$ | $9 \times 10^{-4}$ | $3 \times 10^{-4}$ | $2 \times 10^{-4}$ |
| Possibility of electroforming | ○ | ○ | ○ | ○ |
| Releasability | ○ | ○ | ○ | ○ |

Example 3

Father stampers were manufactured by using Ni—C as a conductive material concentration gradient layer, and fixing the film thickness of the conductive material concentration gradient layer to 5 nm. Masters were prepared by setting the projections pattern height at 20 nm, and changing the groove width to 3, 7, 10, 15, 20, 25, and 30 nm. When using the masters of the embodiment, it was possible to perform duplication by electroforming even when the groove width was 3 nm.

FIG. 6 is a graph showing the relationship between the projections pattern height after electroforming and the master groove width.

Referring to FIG. 6, graphs 101, 102, 103, and 104 respectively represent Example 3, Example 4, Comparative Example 2, and Comparative Example 3.

Comparative Example 2

Masters similar to those of Example 3 were prepared, and father stampers were manufactured by a comparative stamper manufacturing method. The masters were prepared by holding the projections pattern height at 20 nm, and changing the groove width to 3, 7, 10, 15, 20, 25, and 30 nm. When the groove width was 20 nm or less, cavities formed, and the projections pattern height decreased due to pattern collapse in a release process after electroforming, indicating that duplication by electroforming was impossible.

FIG. 6 shows the results.

Example 4

Father stampers were manufactured following the same procedures as in Example 3 except that the projections pattern height of masters was set at 40 nm. The masters were prepared by holding the projections pattern height at 40 nm, and changing the groove width to 3, 7, 10, 15, 20, 25, and 30 nm. When using the masters of the embodiment, it was possible to perform electroforming by using patterns having a groove width of 3 nm, even when the projections pattern height was as large as 40 nm.

FIG. 6 shows the results.

Comparative Example 3

Masters similar to those of Example 4 were prepared, and father stampers were manufactured by a comparative stamper manufacturing method. The masters were prepared by holding the projections pattern height at 5 nm, and changing the groove width to 3, 7, 10, 15, 20, 25, and 30 nm. When the groove width was 20 nm or less, cavities formed, and the projections pattern height decreased due to pattern collapse in a release process after electroforming, indicating that duplication by electroforming was impossible.

FIG. 6 shows the results.

Example 5

A father stamper was manufactured following the same procedures as in Example 1 except that the film thickness of a conductive material concentration gradient layer was fixed to 3 nm. Subsequently, a mother stamper was manufactured by the method shown in FIGS. 4A, 4B, 4C, and 4D. When the content of a buffering material of the manufactured mother stamper was measured by SIMS, the carbon content in the film was 3 at % on the father stamper side and 0.1 at % on the electroformed layer side. That is, both the conductivity and releasability were high.

Example 6

A DTR medium was manufactured using the stamper obtained in Example 1. The master patterns had a track pitch of 75 nm and a groove width of 25 nm, i.e., had the same shape. After that, a mother stamper was manufactured through the processes shown in FIGS. 4A, 4B, 4C, and 4D, and a DTR medium was manufactured through the processes shown in FIGS. 5A, 5B, 5C, 5D, 5E, 5F, 5G, 5H, and 5I. Cyclic olefin polymer ZEONOR 1060R available from ZEON was used as the molding material. A medium shown in FIG. 5A was obtained by sequentially depositing a 120-nm thick soft magnetic layer (CoZrNb), 20-nm thick orientation controlling underlayer (Ru), 15-nm thick ferromagnetic recording layer (CoCrPt—SiO) and 15-nm thick protective layer (C) on a glass substrate, and 3-nm thick Cu was deposited as a metal layer on the protective layer in order to increase the adhesion to a UV resist.

After that, the metal layer was spin-coated with a 50-nm thick UV resist, and UV imprinting was performed using the resin stamper described previously (FIG. 5C). Subsequently, the residue formed by the imprint process was removed by using oxygen gas at a chamber pressure of 2 mTorr, a coil RF of 100 W, and a platen RF of 100 W for an etching time of 30 sec (FIG. 5D). The metal layer was then etched by ion beam etching using Ar gas (FIG. 5E).

After that, the protective layer C was etched by an ICP etching apparatus by using oxygen gas. A C mask was formed by using oxygen as a process gas at a chamber pressure of 2 mTorr, a coil RF of 100 W, and a platen RF of 100 W for an etching time of 30 sec (FIG. 5F).

Ion beam etching was performed through the formed C mask by using He+N$_2$ (the mixing ratio was 1:1) (FIG. 5G).

ECR was used in the ionization of the gas, and etching was performed at a microwave power of 800 W and an acceleration voltage of 1,000V for 20 sec, thereby forming a 10-nm thick projections pattern that partially divided the ferromagnetic recording layer. A 5-nm thick residue of the ferromagnetic recording layer deactivated the magnetism due to the effect of the exposure to He+N$_2$. At the same time, the metal layer (Cu) deposited in the process shown in FIG. 5A was completely removed. After that, the C mask was removed by RIE using oxygen gas at 100 mTorr and 100 W for an etching time of 30 sec (FIG. 5H), and a 4-nm thick surface C protective film was formed by CVD (FIG. 5I) and coated with a lubricant, thereby obtaining a DTR medium.

The manufactured DTR medium had a track pitch of 75 nm a recording track width of 50 nm, and a groove width of 25 nm. After being coated with the lubricant, the DTR medium was incorporated into an HDD drive and evaluated. Consequently, the read/write head positioning accuracy was 6 nm, and the on-track BER was 10 to the −5th power.

Example 7

A BPM was manufactured following the same procedures as in Example 6 except that the patterns shown in FIG. 3 were written by EB lithography. The bit size of the manufactured BPM was 35 nm×15 nm. Since the BER of the BPM cannot be defined, comparison was performed using the signal amplitude intensity. The BPM was magnetized in one direction and incorporated into a drive, and a reproduced waveform was observed. As a consequence, a signal amplitude intensity of 200 mV was obtained. The read/write head positioning accuracy was 6 nm. This reveals that the use of the master of the embodiment makes it possible to manufacture a BPM having finer patterns by the same manufacturing method as that of the DTR medium.

Example 8

A stamper was manufactured by using Ni—C as a conductive material concentration gradient layer. The number of deposition cycles was set to 20, the film thickness of the conductive material concentration gradient layer was fixed to 5 nm, and the content of a buffering material on the master side was changed by changing the reducing gas flow rate (initial reducing gas flow rate) from 10 to 50 sccm in the first two cycles. In the remaining eighteen cycles, the content of the buffering material was gradiently distributed from the initial reducing gas flow rate to 50 sccm. FIG. 7 is a graph showing the relationship between samples deposited on Si substrates having no patterns by different reducing gas flow rates and the buffering material contents obtained by measuring the samples by SIMS.

Table 4 shows the possibility of release of the stamper from the master.

When the buffering material content on the master side was 10% or more (the initial reducing gas flow rate was 10 sccm), no patterns were transferred because the crystallinity deteriorated. When the buffering material content on the master side was 2 at % (inclusive) to 10 at % (inclusive) (when the initial reducing gas flow rate was 12 or 20 sccm), release from the master was possible. However, when the buffering material content on the master side was 1 at % or less (when the initial reducing gas flow rate was 20, 30, or 40 sccm), release was impossible because the adhesion between the master and stamper was strong.

TABLE 4

| | Initial reducing gas flow rate (sccm) | | | | | |
|---|---|---|---|---|---|---|
| | 10 | 12 | 20 | 30 | 40 | 50 |
| Possibility of release | x | ○ | ○ | x | x | x |

Example 9

A stamper was manufactured by using Ni—C as a conductive material concentration gradient layer. The number of deposition cycles was set to 20, the film thickness of the conductive material concentration gradient layer was fixed to 5 nm, the reducing gas flow rate was fixed to 20 sccm in the first ten cycles, and the content of a buffering material on the master side was changed by changing the reducing gas flow rate (final reducing gas flow rate) from 20 to 50 sccm in the ten remaining cycles. Table 5 shows the possibility of electroforming depending on the conductivity.

When the buffering material content on the electroformed layer side was 2% or more (when the final reducing gas flow rate was 20 sccm), film peeling occurred during electroforming, and no electroformed film could be formed. However, when the buffering material content on the electroformed layer side was 1% or less (when the final reducing gas flow rate was 30, 40, or 50 sccm), no film peeling occurred during electroforming, and an electroformed film could be formed.

TABLE 5

| | Final reducing gas flow rate (sccm) | | | |
|---|---|---|---|---|
| | 20 | 30 | 40 | 50 |
| Possibility of electroforming | x | ○ | ○ | ○ |

Example 10

A mother stamper was manufactured following the same procedures as in Example 5 except that Ni—C was used as a conductive material concentration gradient layer on the father stamper side, and TiN—Cl was used as a conductive material concentration gradient layer on the mother stamper side. When the content of a buffering material of the manufactured mother stamper was measured by SIMS, the Cl content in the film was 3 at % on the father stamper side and 0.1 at % on the electroformed layer side. That is, both the conductivity and releasability were high.

Magnetism Deactivation Etching

The projections pattern height is desirably 10 nm or less from the viewpoint of the floating properties of a read/write head, but the film thickness of the ferromagnetic recording layer must be about 15 nm in order to ensure the signal output. Therefore, a DTR medium or BPM capable of suppressing the side erase phenomenon and side read phenomenon while assuring the floating properties of a recording head can be manufactured by physically removing 10 out of 15 nm of the film thickness of the ferromagnetic layer, and magnetically deactivating the remaining 5 nm. As a method of magnetically deactivating the remaining 5 nm, there is a method of exposing a medium to He or N$_2$ ions. When exposing a medium to He ions, the Hc (coercive force) decreases with the exposure time while the squareness of the hysteresis loop is maintained, and the hysteresis disappears before long (magnetism deactivation). If the He gas exposure time is insufficient, a hysteresis having a high squareness (having the Hn (reverse nucleation field)) is held. This means that the ferromagnetic residual layer on the bottom of a recess has recording capability, i.e., the advantage of the DTR medium or PPM is lost. On the other hand, when exposing a medium to $N_2$ ions, the squareness of the hysteresis loop deteriorates with the exposure time, and the hysteresis disappears soon. In this state, the Hn abruptly deteriorates, but the Hc does not easily reduce. If the $N_2$ gas exposure time is insufficient, a large magnetism of the Hc remains on the bottom of a recess, and the advantage of the DTR medium or PPM is lost. Therefore, based on the fact that magnetism deactivation by He gas and that by $N_2$ gas behave differently, the ferromagnetic residual layer on the recess bottom is efficiently deactivated by etching the magnetic material by a gas mixture of He+$N_2$.

Resist Removal

After the magnetism deactivation milling, the C mask is removed. The C mask can readily be removed by oxygen plasma processing. In this process, the carbon protective layer on the surface of the perpendicular recording medium is also removed.

Surface Protective Film Formation—Post-Process

Finally, a C protective film is formed. The C protective film is desirably deposited by CVD in order to improve the coverage to the projections patterns. However, the C protective film can also be deposited by sputtering or vacuum deposition. When forming the C protective film by CVD, a DLC film containing a large amount of $sp^3$-bonded carbon is formed. If the film thickness is 2 rim or less, the coverage worsens. If the film thickness is 10 nm or more, the magnetic spacing between a read/write head and the medium increases, and this often decreases the SNR. A lubricating layer can also be formed on the protective layer. As a lubricant for use in the lubricating layer, it is possible to use a conventionally known material, e.g., perfluoropolyether, alcohol fluoride, or fluorinated carboxylic acid.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions

What is claimed is:

1. A stamper comprising:
   a projections pattern configured to form, on a magnetic recording layer, one of either a recording track or a recording bit, and positioning information of a read/write head;
   a stamper main body comprising the projections pattern on one major surface; and
   a conductive material concentration gradient layer along the one major surface,
   wherein the conductive material concentration gradient layer comprises a buffering material and a conductive material selected from the group consisting of Ni—C, Co—C, and Cu—Cl,
   wherein the content of the buffering material is lower than 10 at %,
   wherein the conductive material concentration gradient layer further comprises the projections pattern,
   wherein the conductive material concentration gradient layer is formed by using a chemical vapor growth method,
   wherein the conductive material concentration gradient layer has a thickness of 0.5 to 10 nm, and
   wherein a concentration of the buffering material with respect to the conductive material decreases from an outer surface toward the stamper main body.

2. A stamper manufacturing method comprising:
   using a chemical vapor growth method to form a conductive material concentration gradient layer on a master;
   wherein the master comprises a projections pattern configured to form on a magnetic recording layer one of either a recording track or a recording bit, and positioning information of a read/write head;
   wherein the conductive material concentration gradient layer comprises a buffering material and a conductive material selected from the group consisting of Ni—C, Co—C, and Cu—Cl,
   wherein the content of the buffering material is lower than 10 at %,
   wherein the conductive material concentration gradient layer has a thickness of 0.5 to 10 nm,
   wherein the conductive material concentration gradient layer comprises the projections pattern, and a composition ratio of a buffering agent to a conductive material;
   wherein the composition ratio decreases from the master towards an outer surface of the conductive material concentration gradient layer;
   using an electroforming process to form a stamper main body comprising the projections pattern;
   wherein the electroforming process uses the conductive material concentration gradient layer as an electrode; and
   releasing from the master a stamper comprising the conductive material concentration gradient layer and the stamper main body.

3. The method of claim 2, wherein the chemical vapor growth method comprises alternately supplying a reaction gas comprising the conductive material and a reducing gas comprising the buffering agent, and wherein the conductive material concentration gradient layer is formed by changing at least one of a flow rate of the reducing gas and a temperature of vapor growth.

4. The method of claim 2, further comprising:
   using the chemical vapor growth method to form on the stamper a second conductive material concentration gradient layer which comprises the projections pattern and a second composition ratio of a second buffering agent to a second conductive material, wherein the second composition ratio decreases from a master side towards a second outer surface of the second conductive material concentration gradient layer;
   using the electroforming process to form a second stamper main body comprising the projections pattern;
   wherein the electroforming process uses the second conductive material concentration gradient layer as a second electrode; and
   releasing from the stamper a second stamper comprising the second conductive material concentration gradient layer and the second stamper main body.

5. A magnetic recording medium manufacturing method comprising:
   using a stamper to duplicate a resin stamper comprising a projections pattern, wherein the stamper is obtained by a stamper manufacturing method comprising:

using a chemical vapor growth method to form a conductive material concentration gradient layer on a master;
wherein the master comprises the projections pattern configured to form on a magnetic recording layer one of either a recording track or a recording bit, and positioning information of a read/write head;
wherein the conductive material concentration gradient layer comprises a buffering material and a conductive material selected from the group consisting of Ni—C, Co—C, and Cu—Cl and a buffering material,
wherein the content of the buffering material is lower than 10 at %,
wherein the conductive material concentration gradient layer has a thickness of 0.5 to 10 nm,
wherein the conductive material concentration gradient layer comprises the projections pattern, and a composition ratio of a buffering agent to a conductive material;
wherein the composition ratio decreases from the master towards an outer surface of the conductive material concentration gradient layer;
using an electroforming process to form a stamper main body comprising the projections pattern;
wherein the electroforming process uses the conductive material concentration gradient layer as an electrode; and
releasing from the master a stamper comprising the conductive material concentration gradient layer and the stamper main body;
adhering a magnetic recording layer surface of a magnetic recording medium to a projections pattern surface of the resin stamper by using a coating layer of an uncured pattern transfer ultraviolet-curing resin material;
curing the coating layer by irradiation with ultraviolet light;
transferring the projections pattern onto one surface of the magnetic recording medium by releasing the resin stamper, and forming an ultraviolet-curing resin material layer by curing the projections pattern; and
dry etching using the cured ultraviolet-curing resin material layer as a mask, thereby forming the projections pattern on the magnetic recording layer surface.

6. The method of claim 5, wherein the chemical vapor growth method comprises alternately supplying a reaction gas containing the conductive material and a reducing gas containing the buffering agent, and wherein the conductive material concentration gradient layer is formed by changing at least one of a flow rate of the reducing gas and a temperature of vapor growth.

7. The method of claim 5, further comprising:
using the chemical vapor growth method to form on the stamper a second conductive material concentration gradient layer which comprises the projections pattern, and a second composition ratio of a second buffering agent to a second conductive material, wherein the second composition ratio decreases from a master side towards a second outer surface of the second conductive material concentration gradient layer;
using the electroforming process to form a second stamper main body comprising the projections pattern;
wherein the electroforming process uses the second conductive material concentration gradient layer as a second electrode; and
releasing from the stamper a second stamper comprising the second conductive material concentration gradient layer and the second stamper main body.

* * * * *